(12) United States Patent
Haeusler et al.

(10) Patent No.: US 7,878,511 B2
(45) Date of Patent: Feb. 1, 2011

(54) WHEEL SUSPENSION

(75) Inventors: Felix Haeusler, Osnabrück (DE);
Christoph Elbers, Dielingen (DE);
Knut Heidsieck, Bünde (DE); Simon Aramah, Osnabrück (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 127 days.

(21) Appl. No.: 12/278,808

(22) PCT Filed: Jan. 30, 2007

(86) PCT No.: PCT/DE2007/000188
§ 371 (c)(1),
(2), (4) Date: Oct. 10, 2008

(87) PCT Pub. No.: WO2007/090372
PCT Pub. Date: Aug. 16, 2007

(65) Prior Publication Data
US 2009/0096183 A1    Apr. 16, 2009

(30) Foreign Application Priority Data
Feb. 10, 2006   (DE) .................. 10 2006 006 513

(51) Int. Cl.
*B60G 3/00* (2006.01)
*B60G 3/26* (2006.01)

(52) U.S. Cl. ............. 280/5.52; 280/86.75; 280/124.136

(58) Field of Classification Search ................ 280/5.52, 280/5.521, 86.75, 86.751, 86.757, 124.134, 280/124.135, 124.136, 124.138, 124.139
See application file for complete search history.

(56) References Cited

U.S. PATENT DOCUMENTS

| | | | |
|---|---|---|---|
| 2,621,036 A | 12/1952 | Rother | |
| 4,700,972 A | 10/1987 | Young | |
| 5,415,426 A | 5/1995 | Strasser | |
| 5,431,429 A * | 7/1995 | Lee | 280/124.139 |
| 5,451,073 A | 9/1995 | Inoue | |
| 5,498,019 A | 3/1996 | Adato | |
| 5,560,637 A * | 10/1996 | Lee | 280/5.521 |
| 5,620,199 A * | 4/1997 | Lee | 280/5.521 |
| 5,700,025 A * | 12/1997 | Lee | 280/86.751 |
| 6,293,561 B1 * | 9/2001 | Goetzen et al. | 280/5.52 |
| 6,386,553 B2 * | 5/2002 | Zetterstrom | 280/5.51 |
| 6,929,271 B2 | 8/2005 | Trotter et al. | |
| 7,222,863 B2 * | 5/2007 | Deal et al. | 280/5.521 |
| 2003/0111812 A1 | 6/2003 | Carlstedt et al. | |

(Continued)

FOREIGN PATENT DOCUMENTS

DE      38 18 240      12/1989

(Continued)

*Primary Examiner*—Paul N Dickson
*Assistant Examiner*—Joseph Rocca
(74) *Attorney, Agent, or Firm*—McGlew and Tuttle, P.C.

(57) ABSTRACT

A wheel suspension for a motor vehicle is described, in which at least a first and at least a second control arm (1, 2) are coupled in an articulated manner to a wheel carrier (4) carrying a vehicle wheel (3). The wheel suspension has a compensating device (5, 6) for correcting wheel positions, and each control arm (1, 2) has a portion of the compensating device (5, 6) or is connected to a portion of the compensating device (5, 6). The compensating device portions (5, 6) of one wheel are connected to one another by at least one coupling member (7, 8).

18 Claims, 8 Drawing Sheets

U.S. PATENT DOCUMENTS

2005/0236797 A1 * 10/2005 Deal et al. ............ 280/124.135

FOREIGN PATENT DOCUMENTS

| | | |
|---|---|---|
| DE | 39 18 359 | 12/1990 |
| DE | 693 20 325 | 1/1999 |
| DE | 695 20 682 | 11/2001 |
| DE | 102 58 166 | 7/2003 |
| EP | 0 378 028 | 7/1990 |
| EP | 1 070 609 B1 | 2/2004 |
| JP | 62 125907 | 6/1987 |
| JP | 6-64422 | 3/1994 |
| JP | 10 264636 | 10/1998 |
| WO | WO 94/12359 | 6/1994 |
| WO | WO 96/37375 | 11/1996 |

* cited by examiner

WHEEL SUSPENSION

CROSS REFERENCE TO RELATED APPLICATIONS

This application is a United States National Phase application of International Application PCT/DE2007/000188 and claims the benefit of priority under 35 U.S.C. §119 of German Patent Application DE 10 2006 006 513.1 filed Feb. 10, 2006, the entire contents of which are incorporated herein by reference.

FIELD OF THE INVENTION

The present invention pertains to a wheel suspension for a motor vehicle, in which at least one first and at least one second control arm are connected in an articulated manner to a wheel carrier carrying a vehicle wheel.

BACKGROUND OF THE INVENTION

As a consequence of higher requirements in terms of safety and comfort, interfering effects acting on the wheel suspension must be compensated increasingly better and in increasingly shorter units of time. For example, the inclination of a vehicle wheel relative to the road surface also changes, for example, due to effects of lateral forces and the roll of the vehicle body. The king pin angle becoming established at the vehicle wheel leads to a change in the tire contact surface, so that the vehicle wheel loses valuable adhesion to the ground.

Double wishbone axles known so far compensate this tendency to the development of a king pin angle by specially affecting the wheel position by generating a negative king pin angle, which is directed in the opposite direction and which can be achieved, for example, by different lengths or orientations of the suspension arms during travel in a curve. However, this leads to drawbacks during the straight-line travel of the motor vehicle, namely, when individual vehicle wheels undergo an inward deflection on one side, as can happen, for example, when traveling over unevennesses of the road surface. Furthermore, an undesired wear of the tire develops in the case of such double wishbone wheel suspensions, and a valuable lateral force potential of the tire is lost.

EP 1 070 609 B1 describes a wheel suspension, which is designed as a double wishbone axle. The peculiarity of this solution is that a steering rocker, which establishes an articulated connection between the vehicle body-side ends of an upper control arm and of a lower control arm, so that the two ends of the control arms are arranged in a common steering rocker, is used as the compensating means. The opposite, wheel-side ends of these control arms are fastened to a wheel carrier each.

Another wheel suspension for a motor vehicle is known from U.S. Pat. No. 6,929,271 B2. The wheel suspension described in this document has stabilizers as compensating means for correcting wheel positions, for example, the king pin angle of the wheel, and both a connection of two wheels located opposite each other, i.e., the wheels of the two sides of the vehicle, and a connection of front wheels with rear wheels are provided. Double-acting piston-and-cylinder units, which are integrated in the stabilizer of the motor vehicle and which bring about a compensation of undesired motions of the wheels, for example, during travel in a curve, can be used as compensating means in this solution. The wheel suspension known from U.S. Pat. No. 6,929,271 B2 has a suspension arm, which is coupled in an articulated manner with a wheel carrier carrying a vehicle wheel.

The common feature of these prior-art solutions is that the forces acting on the vehicle wheels and the undesired displacements of the vehicle wheels, which result from this, are compensated by coupling a plurality of vehicle wheels with one another, and compensating means suitable for this purpose are used.

SUMMARY OF THE INVENTION

The basic object of the present invention is to provide a wheel suspension for a motor vehicle, whose kinematics makes possible an optimal contact of the vehicle wheel with the road surface during straight-line travel and prevents incorrect positions of the vehicle wheel during inward and outward excursions.

A wheel suspension for a motor vehicle, in which a first control arm and a second control arm are coupled in an articulated manner to a wheel carrier carrying a vehicle wheel and which has compensating means for correcting wheel positions, for example, the king pin angle, was perfected according to the present invention to such an extent that each of the control arms has a compensating means or is connected to a compensating means, and the compensating means of one vehicle wheel are connected to one another by at least one coupling member.

Contrary to the embodiments known from the state of the art, the present invention thus has such compensating means at each correspondingly equipped vehicle wheel in special and at each control arm belonging to the vehicle wheel in particular. A connection of a plurality of vehicle wheels of the motor vehicle among each other to achieve a mutual compensation of wheel positions is not the subject of the present invention, but it may represent an additional meaningful addition to the present invention.

By reducing or eliminating the king pin angle of the vehicle wheels relative to the road surface, a decisively reduced risk will become established according to the present invention in extreme driving situations. The handling of a motor vehicle equipped according to the present invention can be varied as desired from "oversteering" via "neutral behavior" to "understeering." In addition, interfering effects, which develop, for example, due to changes in the king pin angle and the track width during straight-line travel on uneven road surfaces, are avoided. The contact surface between the vehicle wheel and the road surface is optimized in such an embodiment. This in turn leads to reduced wear of the tire, improved static friction and hence to an increase in the driving safety of the motor vehicle.

The wheel suspension according to the present invention may have both mechanical and hydraulic, pneumatic or electric motor-operated compensating means. However, mechanical and hydraulic embodiments are preferred, because they can be implemented in a simple manner.

Thus, a first embodiment of the present invention provides for compensating means in the form of hydraulically acting piston-and-cylinder units.

To make it possible to make the entire wheel suspension as compact as possible, it proved, furthermore, to be advantageous if the piston-and-cylinder units are an integral part of the control arms, i.e., they form one unit with the control arms. It is irrelevant in this connection whether this unit is manufactured already at the time of manufacture of the control arms or whether this unit is formed only when the control arms are installed in the motor vehicle by a corresponding mounting. The drawbacks in terms of a heavier own weight of the control arms are minimal compared to the advantages that become established in terms of the dynamic regulation of the king pin angle of every individual vehicle wheel.

Depending on the coupling of the control arms, single-acting pistons can be used as piston-and-cylinder units just as well as double-acting pistons. Double-acting pistons form at least two chambers each and are more efficient as well as able to transmit stronger forces. The suitable piston-and-cylinder unit shall be selected corresponding to the requirements imposed on dynamics and the load to be expected.

If double-acting piston-and-cylinder units are used in a wheel suspension according to the present invention, a "crosswise" connection of the respective piston-and-cylinder units is meaningful. The piston-and-cylinder unit of the first control arm as well as the piston-and-cylinder unit of the second control arm have a wheel carrier-side, outer chamber and a vehicle body-side, inner chamber, the coupling member establishing a connection between the inner chamber of the first control arm and the corresponding outer chamber of the second control arm and/or vice versa.

When the wheel suspension is used in a multiple control arm axle or in a double wishbone axle, it is proposed for the reasons mentioned in the introduction that at least the piston-and-cylinder unit of a first control arm and the piston-and-cylinder unit of at least one second control arm have different dimensions. It proved to be advantageous if the piston-and-cylinder unit of the first control arm has smaller dimensions and has a smaller cross section than the piston-and-cylinder unit of the second control arm. This solution leads to a variant that is analogous to the shortened design of the upper suspension arm of prior-art double wishbone axles.

To make it possible to return the piston-and-cylinder units into their respective neutral starting positions, each piston-and-cylinder unit may have at least one spring to generate a corresponding restoring force.

The above-described embodiments with hydraulically acting compensating means correspond to a preferred possibility of implementing the present invention. Another, very advantageous variant can be seen in a wheel suspension, which has mechanical elements to correct wheel positions becoming established during travel. Thus, rotary control arms may be used as compensating means. For example, a wishbone having three connection points may be used as a rotary control arm.

It is significant here for accomplishing the object according to the present invention that each control arm of the wheel suspension is coupled to at least one such rotary control arm on its side facing away from the vehicle wheel, i.e., on the vehicle body side. The rotary control arms of the respective first control arm and of the corresponding second control arm are connected to one another by at least one coupling member.

Different dimensioning of the rotary control arms is within the scope of the present invention to achieve a desired correction of the wheel position under the effect of lateral forces.

Corresponding to one embodiment of this inventive idea, the connections are designed as joints each, so that each rotary control arm has joints for connection to the control arms, to the respective coupling member and to the vehicle body. A sufficient selection of joints is available in the state of the art. Rotary control arms, such as ball sleeve joints, rotary slide bearings, sleeve-type rubber springs or other elastomer bearings shall be mentioned here as examples only. The joints have one degree of freedom or two degrees of freedom.

A preferred geometric design of the rotary control arms can be seen in that the distance between the connection points of a first, upper rotary control arm is greater than the distance between the connection points of a second, lower rotary control arm.

The ratio of the distance of the connection points of one rotary control arm may also differ relative to the distance of the connection points of a second, lower control arm.

A rocker pendulum may be used as a coupling member. The control arms acting as suspension arms are parts of a wheel suspension according to the present invention, which may be a part of a multiple control arm axle or of a central control arm axle, a single-wheel suspension having considerable advantages for the ability of the present invention to be implemented compared to other wheel suspensions.

The present invention will be explained in more detail below on the basis of the drawings attached. The exemplary embodiments shown do not represent any limitation to the variants shown, but are used only to explain some principles of wheel suspensions according to the present invention. Identical or very similar components are designated by the same reference numbers. To make it possible to illustrate the mode of operation according to the present invention, the figures show only greatly simplified schematic views, in which the components that are not essential for the present invention, such as springs, absorbers and other wheel suspension components, are not shown. However, this does not mean that such components are not present in a wheel suspension according to the present invention. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
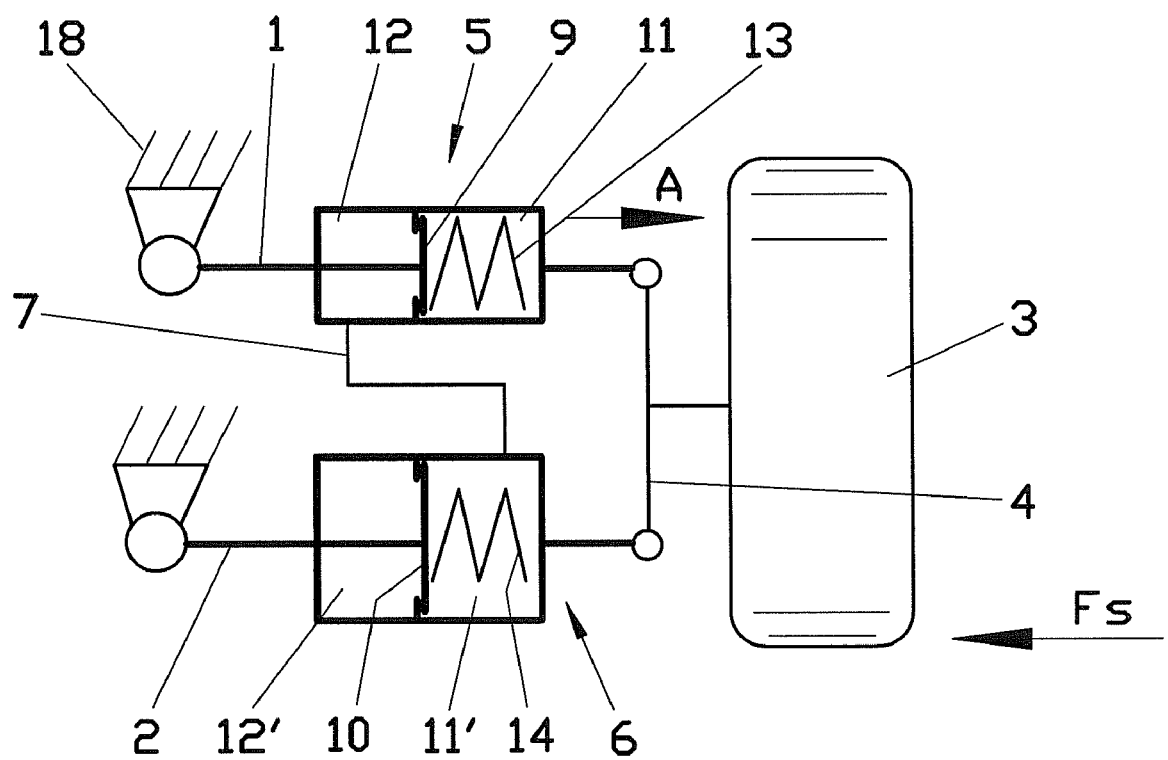
FIG. 1 is a simplified view of a non-deflected wheel suspension with single-acting piston-and-cylinder units as hydraulic compensating means.

Referring to the drawings in particular, the simplified view of a non-deflected wheel suspension, which is shown in FIG. 1, has a vehicle wheel 3, which is arranged on a wheel carrier 4. The wheel carrier 4 is articulated to a first control arm 1 and is likewise articulated to a second control arm 2. The first and second control arms form in the example the upper suspension arm 1 and the lower suspension arm 2 of a double wishbone wheel suspension, which represents a specific design of a single-wheel suspension.

The peculiarity of the wheel suspension shown in FIG. 1 is that the control arms 1 and 2 have a single-acting piston-and-cylinder unit each, which are used as a hydraulic compensating means 5 and 6, respectively. These piston-and-cylinder units 5, 6 are used to correct undesired wheel positions, for example, a king pin angle that becomes established during travel in a curve. A separate piston-and-cylinder unit 5, 6 is integrated in each of the control arms 1, 2 in the variant being shown, i.e., the control arms 1, 2 and the respective piston-and-cylinder units 5, 6 belonging to them form one assembly unit each in this case. The piston-and-cylinder unit 5 of the first control arm 1 is connected by a coupling member 7 to the piston-and-cylinder unit 6 of the second control arm 2. A hydraulic line 7 is used as a coupling member here. The piston-and-cylinder unit 5 is divided by a piston 9 into two chambers 11 and 12. To make it possible to return the deflected piston 9 into its neutral starting position at any time, the chamber 11 has a spring 13, which is supported by the chamber wall, on the one hand, and by the piston 9, on the other hand. The piston-and-cylinder unit 6 has a design analogous to that of the piston-and-cylinder unit 5. The piston-and-cylinder unit 6 also has a piston 10, which divides the piston-and-cylinder unit 6 into two chambers 11' and 12' and is held in position by a spring 14. Due to the motion of the piston 9 of the piston-and-cylinder unit 5 of the first control arm 1 in the direction of arrow A shown in FIG. 1, hydraulic fluid is delivered via the hydraulic line 7 from chamber 11' of piston-and-cylinder unit 6 of the second control arm 2 into chamber 12 of the piston-and-cylinder unit 5 of the first control arm 1.

The hydraulic fluid is also delivered in the opposite direction in case the direction of motion of the piston is reversed. Thus, there is an equalization between the piston-and-cylinder units 5 and 6. It should also be mentioned that the piston-and-cylinder unit 5 has a smaller volume than the piston-and-cylinder unit 6, so that the volume of the lower piston 10 of the piston-and-cylinder unit 6, which said volume is displaced by a lateral force $F_S$ acting on the vehicle wheel 3, produces a greater path of displacement of the smaller piston 9 of the piston-and-cylinder unit 5 and the paths of the two control arms 1, 2 are thus different. Thus, a desired negative king pin angle becomes established at the vehicle wheel 3. The support points of the control arms consequently change their positions as a function of the diameter of the piston and the displaced volume.

Figure 2:
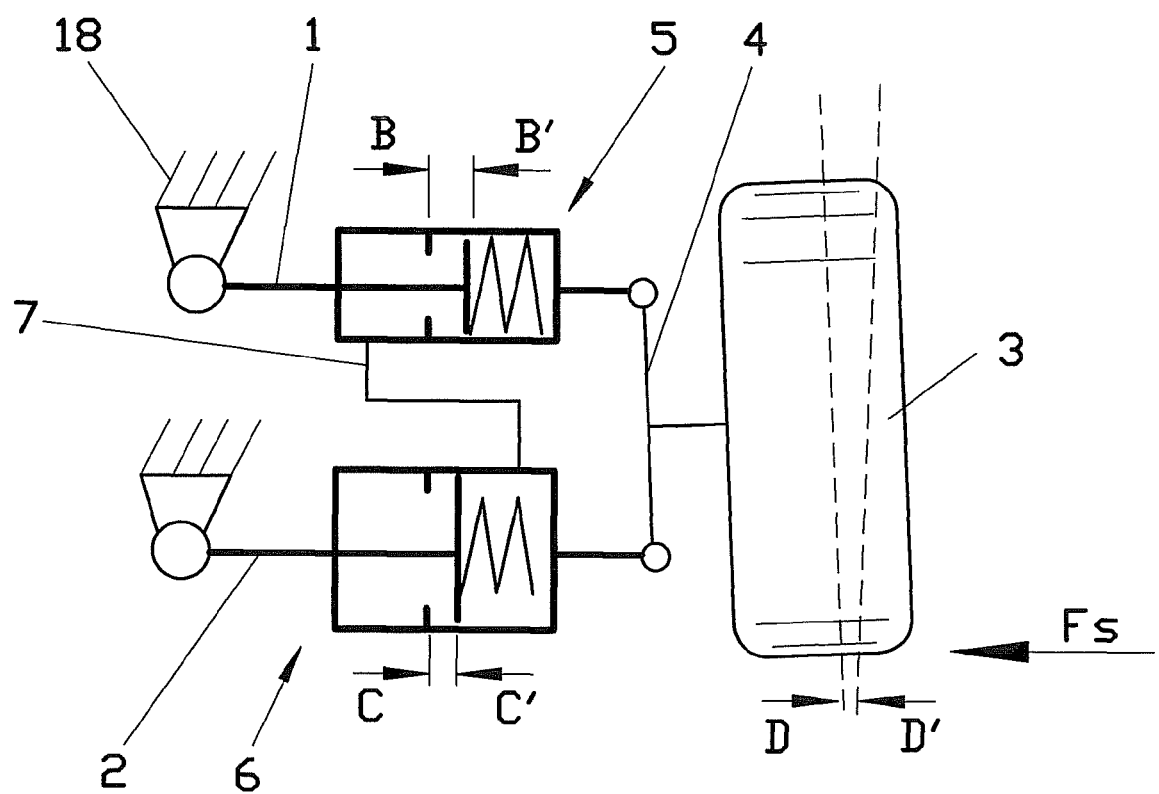
FIG. 2 is the wheel suspension according to FIG. 1, but in a deflected position of the vehicle wheel.

The fact that the paths of the control arms 1 and 2 are different in case of a lateral force $F_S$ acting on the vehicle wheel 3 can be clearly seen in the view shown in FIG. 2. The path traveled by the piston 9 of the piston-and-cylinder unit 5 is indicated here by the arrows B-B' and the path of piston 10 of the piston-and-cylinder unit 6 by the arrows C-C'. The vehicle wheel 3 has a slightly negative king pin angle, which is shown by the broken lines as well as by arrows D-D' at the vehicle wheel 3. The wheel suspension shown in FIG. 2 has the same design as that in FIG. 1.

Figure 3:
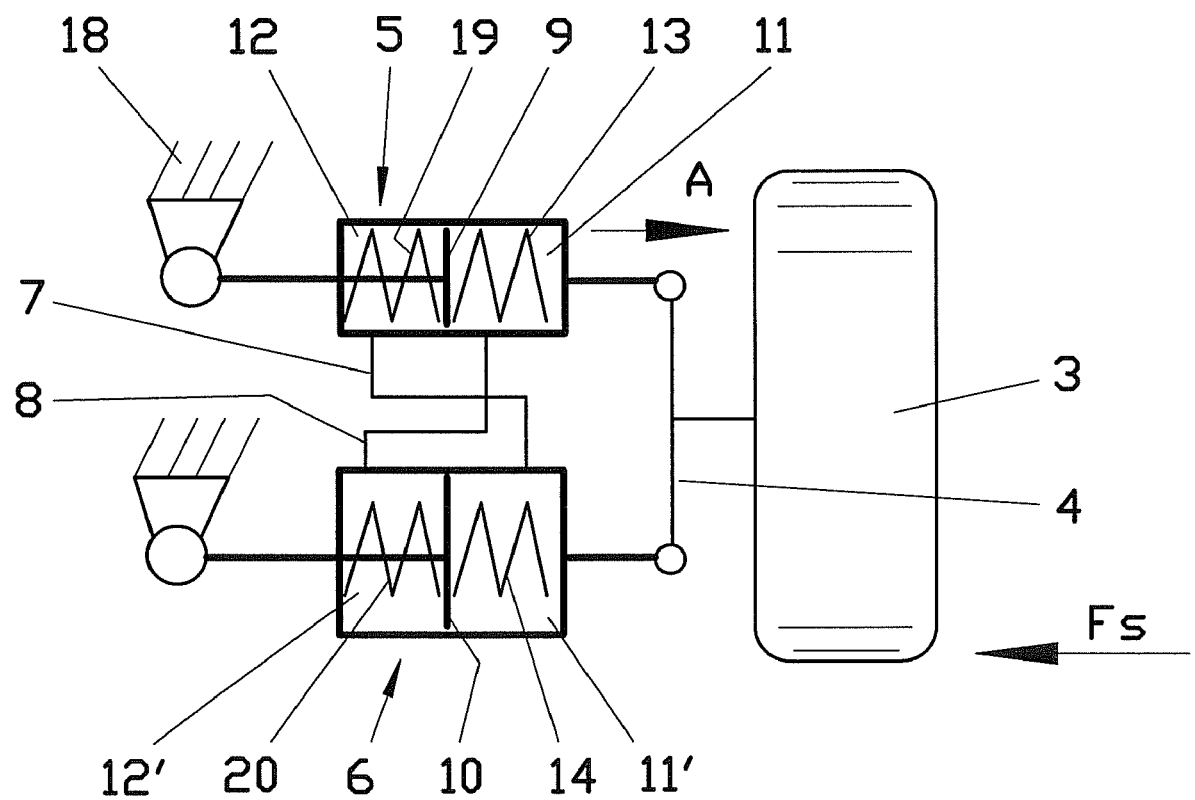
FIG. 3 is a simplified view of a non-deflected wheel suspension with double-acting piston-and-cylinder units as hydraulic compensating means.

FIG. 3 shows a simplified view of a non-deflected wheel suspension with double-acting piston-and-cylinder units 5, 6 as hydraulic compensating means. Piston 9 divides the piston-and-cylinder unit 5 into two chambers 11 and 12. A spring 13 is located in each of the chambers 11, 12 on one side of the piston and a spring 19 is located on the other side of the piston. Piston 10 divides the piston-and-cylinder unit 6 into two chambers 11' and 12'. A spring 14 is located on one side of the piston and one spring 20 on the other side of the piston in each of the chambers 11', 12'.

Springs 13, 19 and 14, 20 position the respective pistons 9 and 10 in their neutral starting positions.

Chamber 12 of the piston-and-cylinder unit 5 is connected to chamber 11' of the piston-and-cylinder unit 6 by means of a hydraulic line 7. In addition, this wheel suspension also has an additional coupling member 8. This coupling member, designed as a hydraulic line 8, connects chamber 11 of the piston-and-cylinder unit 5 to chamber 12' of the piston-and-cylinder unit 6. The chambers are thus coupled "crosswise."

Figure 4:
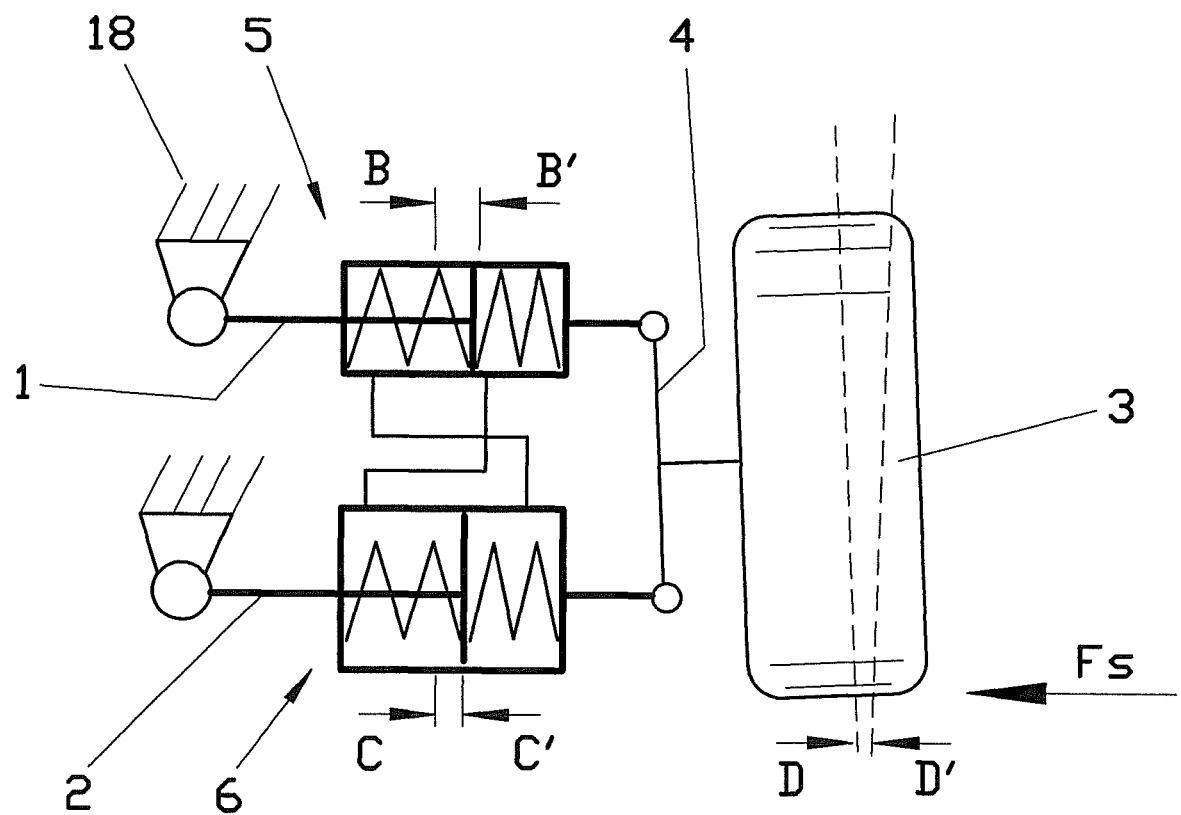
FIG. 4 is the wheel suspension according to FIG. 3, but in a deflected position of the vehicle wheel.

FIG. 4 shows the wheel suspension according to FIG. 3, but in a deflected position of the vehicle wheel. As was already explained in connection with FIG. 2, the different paths of the control arms 1 and 2 are indicated by the arrows B-B' and C-C' in FIG. 4 as well. The desired negative king pin angle becomes established at the vehicle wheel 3. The inclination of the vehicle wheel 3 in relation to the vertical is indicated by the arrows D-D'.

Figure 5:
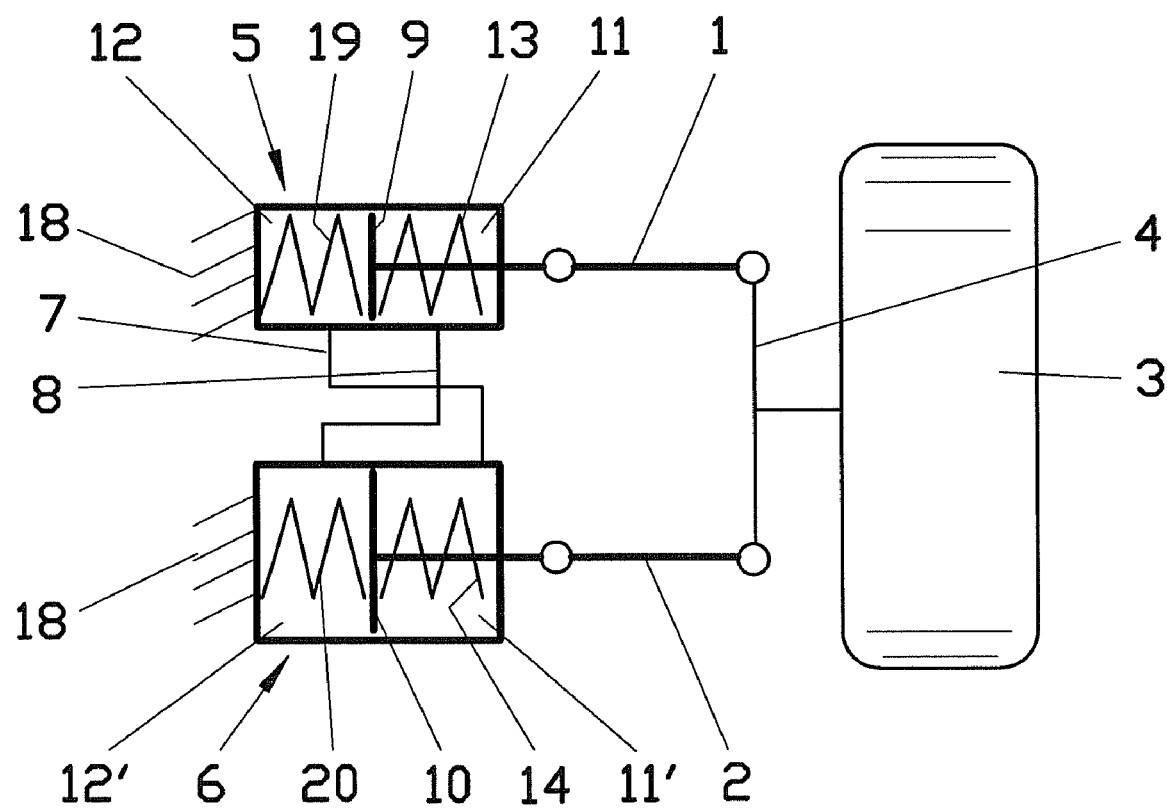
FIG. 5 is a wheel suspension with fastening of the hydraulic compensating means on the vehicle body.

FIG. 5 shows another variant of a wheel suspension according to the present invention with a very simple fastening of the hydraulic compensating means 5, 6 on the vehicle body 18.

The control arms 1 and 2 no longer act on the cylinder of the piston-and-cylinder unit 5, 6 on the wheel carrier side, as in the embodiments described up to now, but they are arranged on the wheel carrier side at the respective pistons 9 and 10. The cylinders, i.e., the housings of the piston-and-cylinder units 5, 6, are fastened to the vehicle body 18, and this fastening may be indirect or direct. This variant of a wheel suspension has a very simple design and therefore has considerable advantages.

Another, very advantageous mode of construction of a wheel suspension according to the present invention will be explained in more detail below in connection with FIGS. 6 and 7. Thus, FIG. 6 shows a simplified view of a non-deflected mechanical wheel suspension with rotary control arms as mechanical compensating means, and FIG. 7 shows the wheel suspension according to FIG. 6, but in a deflected position of the vehicle wheel 3.

The peculiarity of this wheel suspension is that the control arms 1, 2 are connected on the vehicle body side to the vehicle body via separate rotary control arms 5 and 6, respectively. Rotary control arm 5, which is the upper rotary control arm in FIGS. 6 and 7, has a coupling member 7 in the form of a rocker pendulum, via which it is connected to the lower rotary control arm 6. The articulated mounts 15, 16, 17 and 15', 16', 17' of the rotary control arms 5, 6 are elastomer bearings to guarantee acoustic insulation as well as vibration absorption. At the same time, a righting moment M is generated by the rotational rigidity of such elastomer bearings.

When a lateral force $F_S$ is applied, the articulation point 17' of the lower suspension arm 2 at the rotary control arm 6 is at first shifted towards the center of the vehicle. Arrows E-E' are shown in FIG. 7 for illustration. This motion is transmitted via the rocker pendulum 7 to the rotary control arm 5. As a consequence of this, articulation point 17 of the upper suspension arm 1 at the rotary control arm 5 is likewise moved in the direction of the center of the vehicle, which is shown in FIG. 7 by arrows F-F' for illustration.

Figure 6:
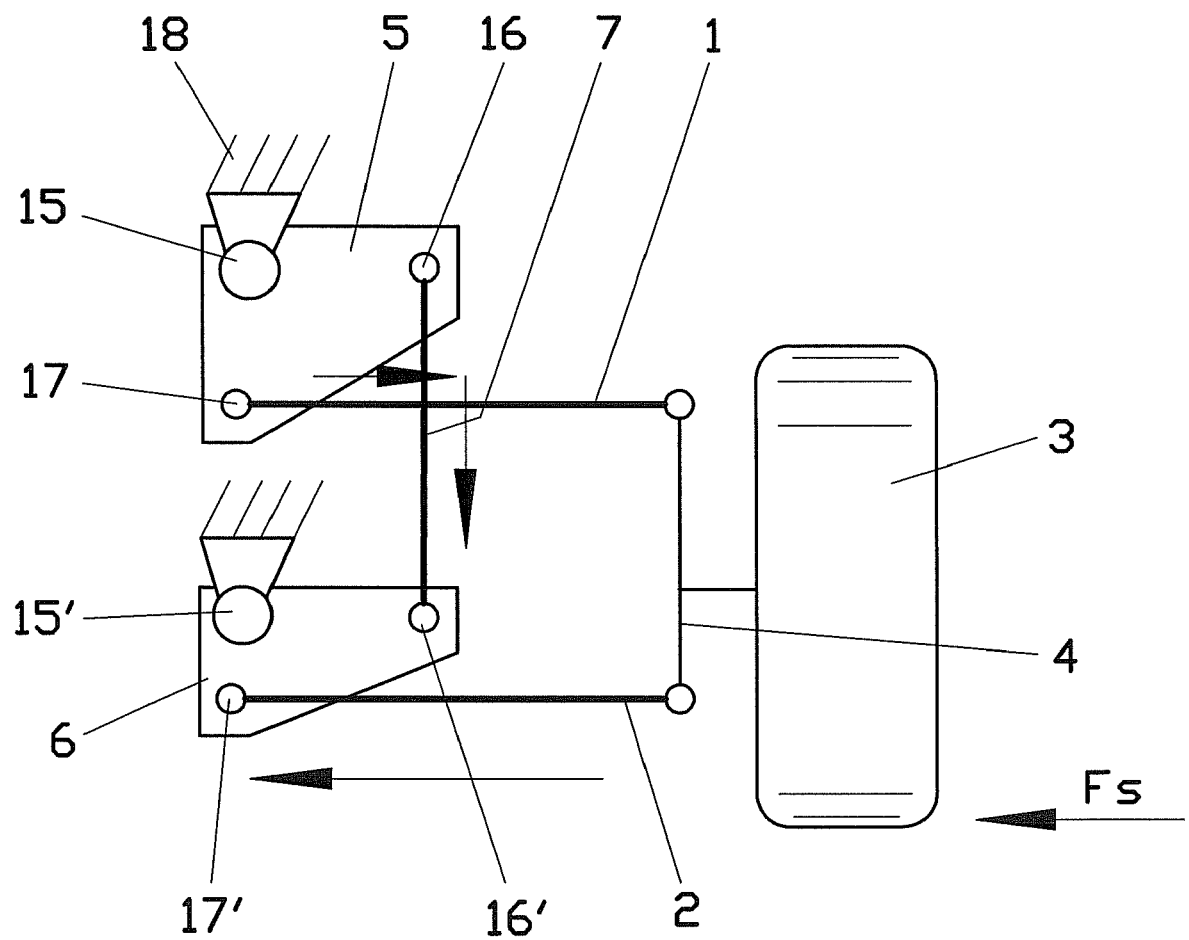
FIG. 6 is a simplified view of a non-deflected wheel suspension with rotary control arms as mechanical compensating means.
Figure 7:
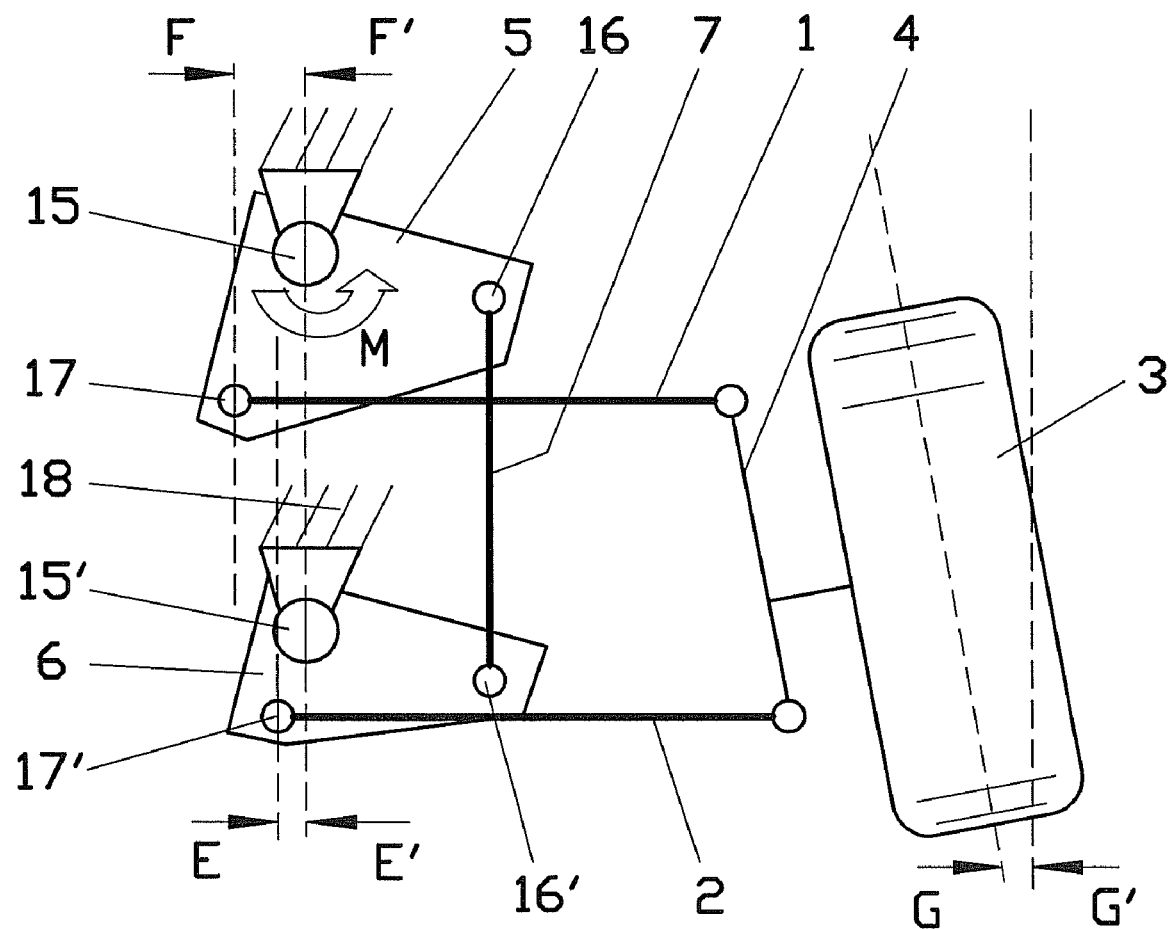
FIG. 7 is the wheel suspension according to FIG. 6, but in a deflected position of the vehicle wheel.

As is also apparent from FIGS. 6 and 7, the upper rotary control arm 5 has larger dimensions than the lower rotary control arm 6. Due to this difference in the geometries of the rotary control arms 5 and 6, the upper articulation point 17 is moved more in the direction of the center of the vehicle than the lower articulation point 17', which leads to a desired additional king pin angle. This is possible because the forces are markedly stronger in the lower suspension arm 2 (depending on the axle geometry) than in the upper suspension arm.

The tendency of the vehicle wheel to acquire a king pin angle, which was mentioned before, is illustrated by the broken line and arrows G-G' in FIG. 7.

Figure 8:
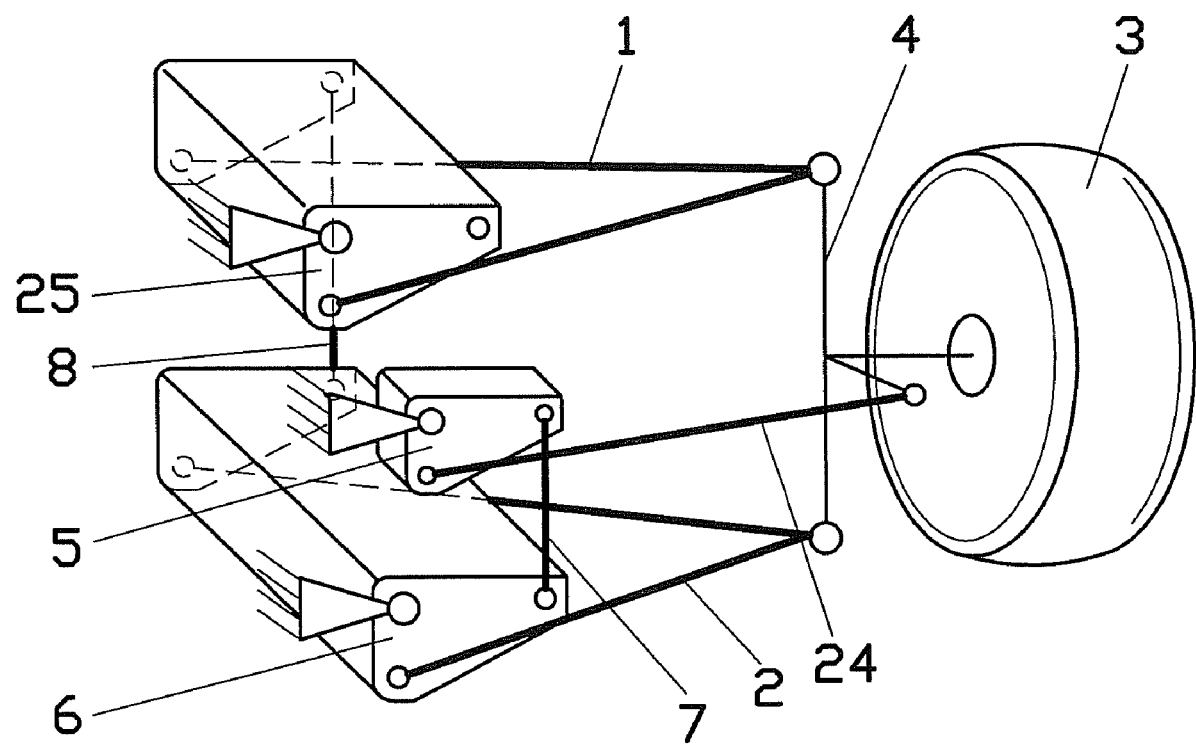
FIG. 8 is a simplified three-dimensional view of a non-deflected wheel suspension with a plurality of rotary control arms as mechanical compensating means.

FIG. 8 shows, furthermore, another simplified three-dimensional view of a non-deflected wheel suspension with a plurality of rotary control arms 5, 6, 25 as mechanical compensating means. The rotary control arm 25 is connected here to control arm 1; rotary control arm 6 to control arm 2, and the rotary control arm 5, which is shown approximately in the center in this case, is connected to an additional control arm 24. Control arms 1 and 2 are designed as suspension arms with a triangular geometry here. Control arm 24 is arranged on the wheel side at the wheel carrier 4 via a pivoting bearing. A rocker pendulum 7 is arranged as a coupling member between the rotary control arm 5 shown in the center and rotary control arm 6. The rotary control arm 25 also has a rocker pendulum 8 as a coupling member, which is fastened at its opposite end to the rotary control arm 6 on a common axis with the rocker pendulum 7. Not only changes in the king pin angle, but also changes in the track of the vehicle wheel 3 can be corrected with such a wheel suspension. As a result, it is possible to affect especially the self-steering properties (oversteering or understeering) of the motor vehicle.

While specific embodiments of the invention have been shown and described in detail to illustrate the application of the principles of the invention, it will be understood that the invention may be embodied otherwise without departing from such principles.

The invention claimed is:

1. A wheel suspension for a motor vehicle, the wheel suspension comprising:
    a wheel carrier carrying a vehicle wheel;
    a first control arm connected in an articulated manner to said wheel carrier;
    a second control arm connected in an articulated manner to said wheel carrier;
    a compensating/equalizing means for correcting wheel positions, said first control arm including a first portion of said compensating/equalizing means or said first control arm being directly connected to said first portion of said compensating/equalizing means and said second control arm including a second portion of said compensating/equalizing means or said second control arm being directly connected to said second portion of said compensating/equalizing means; and
    a coupling member connecting said first portion of said compensating/equalizing means with said second portion of said compensating/equalizing means, said first portion of said compensating/equalizing means comprising a first rotary control arm and said second portion of said compensating/equalizing means comprising a second rotary control arm, said compensating/equalizing means comprising a third portion, said third portion comprising a third rotary control arm rotatably mounted to the vehicle body, said third rotary control arm being connected to said wheel carrier.

2. A wheel suspension in accordance with claim 1, wherein each of said first rotary control and said second rotary control arm comprise a wishbone having at least three connection points.

3. A wheel suspension in accordance with claim 1, wherein each of said first rotary control arm and said second rotary control arm has joints for connection to the control arms, to the coupling member and to the vehicle body.

4. A wheel suspension in accordance with claim 3, wherein the joints are revolute joints or elastomer bearings.

5. A wheel suspension in accordance with claims 1, wherein said first rotary control arm and said second rotary control arm have different dimensions.

6. A wheel suspension in accordance with claim 1, wherein a distance between connection points of said first rotary control arm is greater than a distance between connection points of said second rotary control arm.

7. A wheel suspension in accordance with claim 1, wherein a ratio of a distance between a first set of connection points to a distance between a second set of connection points of said first rotary control arms is greater than a ratio of the distance between a first set of connection points to a distance between a second set of connection points of said second rotary control arm.

8. A wheel suspension in accordance with claim 1, wherein said coupling member is a rocker pendulum.

9. A wheel suspension in accordance with claim 1, wherein said control arms are suspension arms or steering tie rods.

10. A wheel suspension in accordance with claim 1, wherein the wheel suspension is part of a multiple control arm axle or of a central control arm axle.

11. A wheel suspension in accordance with claim 1, wherein the wheel suspension is a single-wheel suspension.

12. A wheel suspension for a motor vehicle, the wheel suspension comprising:
    a wheel carrier carrying a vehicle wheel;
    a first control arm connected to said wheel carrier;
    a second control arm connected to said wheel carrier;
    a compensating/equalizing means for correcting wheel positions, said first control arm comprising a first portion of said compensating/equalizing means or said first control arm engaging said first portion of said compensating/equalizing means and said second control arm comprising a second portion of said compensating/equalizing means or said second control arm engaging said second portion of said compensating/equalizing means; and
    a coupling member connecting said first portion of said compensating/equalizing means with said second portion of said compensating/equalizing means, wherein said first portion of said compensating/equalizing means comprises a first rotary control arm and said second portion of said compensating/equalizing means comprises a second rotary control arm, said compensating/equalizing means comprising a third portion, said third portion comprising a third rotary control arm rotatably mounted to the vehicle body, said third rotary control arm being connected to said wheel carrier.

13. A wheel suspension in accordance with claim 12, wherein said first rotary control arm and said second rotary control arm have different dimensions.

14. A wheel suspension in accordance with claim 13, wherein a distance between connection points of said first rotary control arm is greater than a distance between connection points of said second rotary control arm.

15. A wheel suspension in accordance with claim 13, wherein a ratio of a distance between a first set of connection points of said first rotary control arm to a distance between a second set of connection points of said first rotary control arms is greater than a ratio of the distance between a first set of connection points of said second rotary control arm to a distance between a second set of connection points of said second rotary control arm.

16. A wheel suspension for a motor vehicle, the wheel suspension comprising:
    a vehicle body;
    a vehicle wheel;

a wheel carrier carrying said vehicle wheel;

a first control arm connected to said wheel carrier;

a second control arm connected to said wheel carrier;

a first rotary control arm movably mounted to a portion of said vehicle body such that said first rotary control arm is rotatable with respect to said vehicle body, said first rotary control arm being in direct contact with said first control arm;

a second rotary control arm movably mounted to another portion of said vehicle body such that said second rotary control arm is rotatable with respect to said vehicle body, said second rotary control arm being in direct contact with said second control arm, said first rotary control arm and said second rotary control arm defining at least a portion of a means for correcting a wheel position of said vehicle wheel;

a third rotary control arm rotatably mounted to yet another portion of said vehicle body such that said third rotary control arm is rotatable with respect to said vehicle body, said third rotary control arm being connected to said wheel carrier, said third rotary control arm defining another portion of said means for correcting said wheel position of said vehicle wheel;

a coupling member, said first rotary control arm being connected to said second rotary control arm via said coupling member; and another coupling member, said third rotary control arm being connected to one of said first rotary control arm and said second rotary control arm via said another coupling member.

17. A wheel suspension in accordance with claim 16, wherein a distance between connection points of said first rotary control arm is greater than a distance between connection points of said second rotary control arm.

18. A wheel suspension in accordance with claim 16, wherein a ratio of a distance between a first set of connection points of said first rotary control arm to a distance between a second set of connection points of said first rotary control arms is greater than a ratio of the distance between a first set of connection points of said second rotary control arm to a distance between a second set of connection points of said second rotary control arm.

* * * * *